United States Patent Office 2,744,937
Patented May 8, 1956

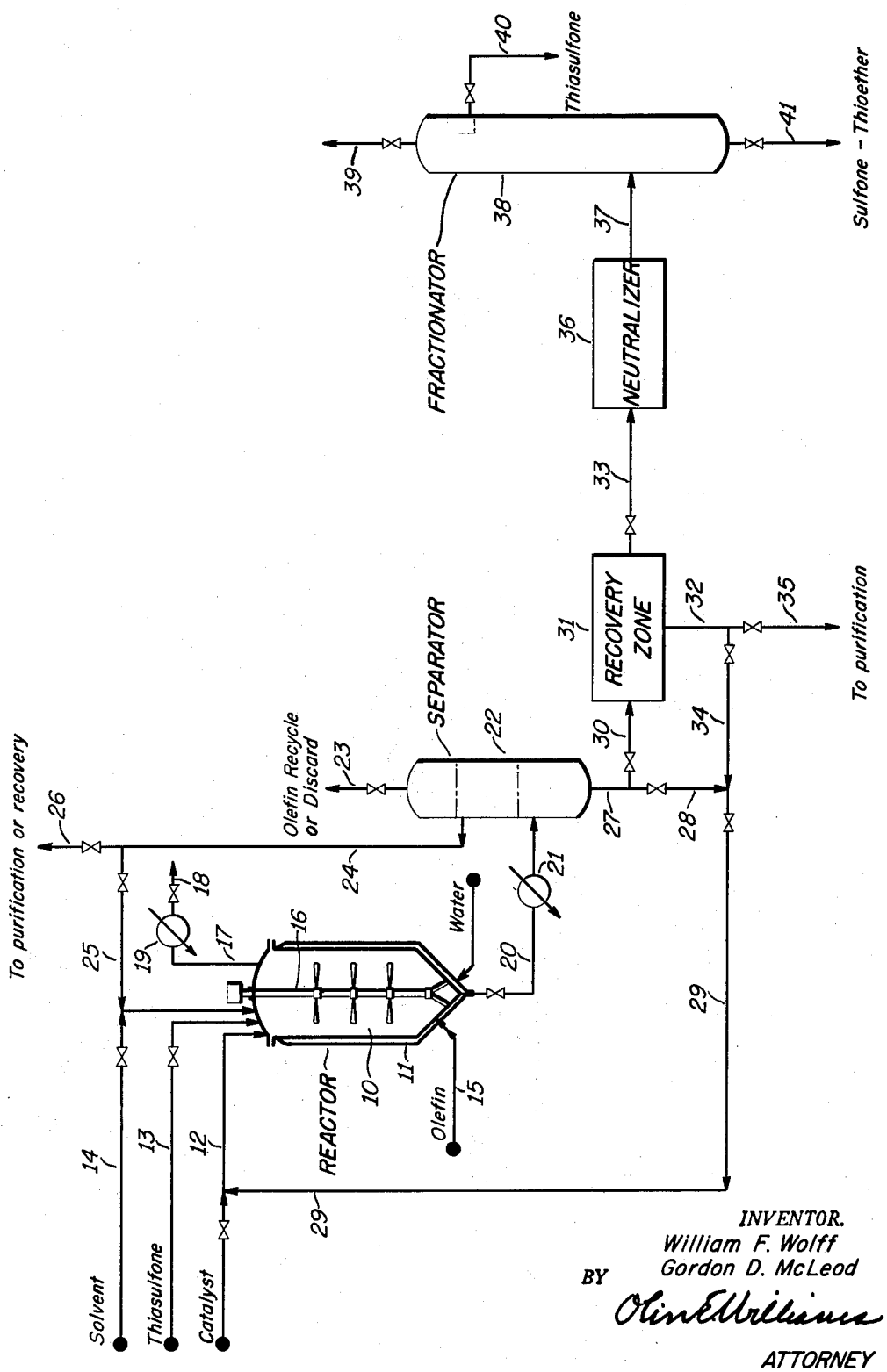

2,744,937

PREPARATION OF SULFONE THIOETHERS

William F. Wolff, Park Forest, and Gordon D. McLeod, Lansing, Ill., assignors to Standard Oil Company, Chicago, Ill., a corporation of Indiana Application February 29, 1952, Serial No. 274,256

28 Claims. (Cl. 260—609)

This invention relates to the preparation of organic sulfone thioethers.

Organic thioethers that contain at least one sulfone or sulfoxide group in addition to the thioether group have been found to be widely useful, for example, as oxidation inhibitors. These sulfur and oxygen bearing thioethers have hitherto been prepared by the reaction of relatively difficultly obtainable compounds such as alkyl sulfonyl alkenes with mercaptans. A primary object of the present invention is the provision of a process for preparation of these useful compounds from materials available to a practicable degree in oil refineries. Another object of the invention is the provision of a novel method of preparing organic thioethers in which compound at least one sulfur atom is bonded to at least one oxygen atom. A further object of the invention is the provision of processes for the conversion of by-product petroleum sulfur compounds and olefins into these sulfonyl thioethers. Yet another object of the invention is the provision of a process for the preparation of particularly the 1,4 sulfone thioethers by reaction between organic thiolsulfonic esters, which are also termed thiasulfones, and olefins or materials capable of generating olefins under the reaction conditions. Yet another object of the invention is the provision of a process for the preparation of sulfone thioethers from thiolsulfonic esters or thiasulfones with organic compounds containing at least one double bond. The invention has for further objects such advantages or results as will be found in the specification or the claims hereinafter made.

The reaction with which the present invention is concerned may be expressed in terms of the following equation:

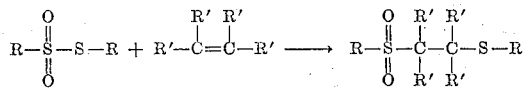

wherein each R represents an organic radical and each R' may be hydrogen or an organic radical. The reactant characterized in the above equation by the formula $RSO_2SR$ is thus represented to be an organic thiolsulfonic ester or thiasulfone. This agrees with the greater weight of present evidence (cf. Gilman; Organic Chemistry, vol. I, p. 912 (2nd ed.), John Wiley and Sons, New York), although the reactants of this class are sometimes termed disulfoxides and written as RSOSOR. The purposes of the present invention are equally served by either interpretation of the structure of these reactants, which will hereinafter be termed organic thiasulfones. In accordance with the foregoing evidence it is assumed that a reaction product is the compound having the structure represented in the equation above.

The reaction characterized above can be catalyzed by the employment of acidic condensation catalysts. Examples of acidic condensation catalysts are strong acids such as concentrated sulfuric acid (about 60 to about 98 percent), halogen sulfonic acids such as chloro- or fluosulfonic acids; benzenesulfonic, toluenesulfonic, methanesulfonic, ethanesulfonic acids and the like; concentrated or substantially anhydrous hydrogen fluoride; phosphorus acids, for example meta-, pyro-, ortho- and tetra-phosphoric acids; trichloroacetic and trifluoroacetic acids, $BF_3$ in combination with trifluoroacetic acid; dihydroxyfluoboric acid, alone or in combination with $BF_3$; ansolvo acids in combination with relatively weak acids, for example the combination of zinc chloride with acetic acid, and the like. Preferred acidic condensation agents are phosphoric acid, 80 percent sulfuric acid, and alkanesulfonic acids. Of these, phosphoric acid is most readily controllable at the temperatures and reaction rates employed in the synthesis of the sulfone thioethers, because the use of phosphoric acid substantially always results in the production of a high quality, readily purifiable product. Hydrogen fluoride is most effective at lower temperatures within the operating temperature range and should not be employed at the higher temperatures, where it tends to cause excessive side reactions.

The term "acidic condensation catalyst" also includes acid-acting metal halide condensation catalysts such as have heretofore been found effective for the alkylation of aromatic or isoparaffinic hydrocarbons with mono-olefinic hydrocarbons. These have sometimes been classified as Friedel-Crafts catalysts and include aluminum chloride and its complexes with various organic compounds, particularly hydrocarbons; boron fluoride or its complexes such as hydrates, etherates, alcoholates, esterates and the like; ferric chloride, stannic chloride, gallium chloride, germanium chloride, zirconium chloride, titanium chloride, beryllium chloride, columbium chloride, tantalum chloride, aluminum bromide, sodium aluminum chloride and the like. It is sometimes advantageous to employ the metal halide condensation catalysts in combination with a small proportion by weight of a hydrohalogen acid promoter, for example hydrogen chloride.

The process of this invention may be applied to the organic thiasulfones in general. They may be symmetrical or unsymmetrical thiasulfones; in other words, the thiasulfones may have the general formula $R_1SO_2SR_2$ wherein $R_1$ and $R_2$ are organic radicals which may be the same or different. The process of this invention may be applied to acyclic or cyclic hydrocarbon thiasulfones containing radicals such as alkyl, cycloalkyl, cycloalkyl-alkyl, aryl-cycloalkyl, aryl, alkaryl, cycloalkyl-aryl, aralkyl, and the like. Thus thiasulfones such as the following may be employed in the process of this invention: dimethyl, diethyl, di-n-propyl, diisopropyl, methyl ethyl, methyl propyl, methyl butyl, dibutyl, dilauryl, dicetyl, dicyclohexyl, dicresyl, diphenyl, ditolyl, phenyl tolyl, dixenyl.

It is not essential to use pure thiasulfones in the process of this invention. Thiasulfones that are prepared by the mild oxidation of disulfides or mercaptans often obtained in industrially available materials can be employed. Almost all known petroleum hydrocarbon fractions contain sulfur compounds and are consequently often sweetened by processes which yield hydrocarbon disulfides. These disulfides can easily be oxidized to form the organic thiasulfones which constitute the feed stock of the present process. These thiasulfones are perhaps most readily prepared by slowly adding diluted nitric acid to disulfides. Thiasulfones can also be prepared by careful oxidation of organic disulfides with hydrogen peroxide at room temperature and in the presence of a mild acid (acetic acid). It is preferable carefully to wash and distill the oxidation products and therefore employ, in the present reaction, purified products. However, as above mentioned, impure thiasulfones obtained by sweetening and oxidation of above mentioned hydrocarbon fractions will provide effective reactants.

The process of this invention may be applied to diverse types of organic compounds containing olefinic saturation.

Thus the invention may be practiced with olefinic hydrocarbons, for example, acyclic mono-olefinic hydrocarbons such as ethylene, propylene, 1- or 2-butene, isobutylene, pentenes, hexenes, decenes, cetenes, styrene, alpha-alkyl styrenes such as alpha-methyl styrene, alpha- or beta-vinylnaphthalene; polymers of the above and similar olefins, for example diisobutylene which is a mixture of 2,4,4-trimethyl-1- and -2-pentenes, propylene or isobutylene trimers and tetramers, and the like. The olefinic polymer employed may be depolymerizable under the reaction conditions to yield the monomeric olefin which will then enter into reaction with the organic thiasulfone.

Poly-olefins may also be employed in this invention, for example 1,3-butadiene, isoprene, 2,3-dimethyl-1, 3-butadiene, cyclopentadiene, dicyclopentadiene, 1,4-pentadiene, 1,5-hexadiene, divinyl-benzene and the like.

We may also employ cyclo-olefins, e. g., cyclohexene, methyl cyclohexenes, cyclopentene, methylcyclopentenes, terpenes, 3-vinylcyclohexene, cyclohexadiene-1,3-, p-benzoquinone.

We may also employ a variety of substituted olefins in the practice of this invention, for example dichlorostyrenes, trifluoro-methylvinyl-benzenes; vinyl heterocyclic compounds such as vinylthiophenes, vinylfuranes and vinyl pyridines; methylvinyl ketone, vinyl acetate, esters of crotonic, acrylic, methacrylic or sorbic acids, etc.

The process of the present invention may be practiced not only with olefinic compounds but also with materials capable of yielding these compounds under reaction conditions. Thus, as has been pointed out above, depolymerizable polymers may be employed as a source of olefin monomer for the reaction with a thiasulfone. Examples of such polymers are di-, tri- or tetra-isobutylenes. In the presence of acidic condensation catalysts certain highly branched chain paraffinic hydrocarbons undergo cleavage to yield olefinic hydrocarbons and may be employed as a source of olefins for the present invention; a suitable example of such a highly branched chain paraffin hydrocarbon is commercial isooctane which comprises predominantly 2,2,4-trimethylpentane. Cycloalkanes of highly strained ring structure such as cyclopropane and substituted cyclopropanes, e. g. methyl- or ethyl-cyclopropane, can function as a source of propylene or substituted propylenes in the presence of acidic condensation catalysts.

Certain derivatives of olefin hydrocarbons are unstable in the presence of acidic condensation catalysts and are capable of yielding olefins in their presence. This is especially true of derivatives of tertiary olefins. These derivatives comprise mercaptans, alcohols, ethers, halides and the like. Examples are tert-butylmercaptan, ethanol, isopropanol, tert-butanol, di-tert-butyl ether, tertiary octyl chlorides, tert-methylcyclopentyl chloride, tert-butylchloride, tert-amyl chloride.

Compounds containing a double bond that is relatively disassociated from the functional grouping of the molecule, such, for example, as oleic acid, can be employed as the olefinic reactant. Oleic acid exhibited immediate reaction with dimethyl thiasulfone in the presence of a sulfuric acid catalyst.

Because of the variety of reactants and catalysts which may be employed in the practice of the process of this invention it would be impractical to set out the precise or preferred operating conditions for each of the possible permutations and variations contemplated herein. In general, suitable temperatures for the reaction are between about −20° C. and about 170° C. Usually it is desirable to operate at a temperature within the range of about 10° C. to about 100° C.

The reaction under consideration proceeds readily at atmospheric or elevated pressures, for example 50, 100, 500, 1,000 p. s. i. g. or even higher pressures. The pressure and temperature in the reaction zone are ordinarily correlated to maintain the organic thiasulfone and the catalyst in the liquid phase, although a vapor phase reaction is not excluded. Sufficient pressure may be maintained upon the reaction zone to maintain the olefin in the liquid phase or in solution.

The length of the reaction period that will obtain the desired amount of conversion depends upon reaction conditions which can be adjusted to obtain a fairly rapid reaction so that reaction periods may be varied between several minutes and several hours, for example, five to twenty hours. The residence time of the reactant in the reactor is preferably of the order of about thirty minutes to ten hours.

In the reaction zone the olefinic compound and organic thiasulfone are preferably maintained in a mol ratio of about 1 although in some cases it may be desirable to use an excess of one or the other reactant.

As pointed out above, a wide variety of acidic condensation catalysts can be employed to facilitate the reaction of this invention. These catalysts are not precisely equivalent, and consequently considerable variation in the amount of catalyst to be employed may be expected. Generally speaking, the employment of at least one mol of the strong acid condensation catalyst per mol of thiasulfone is desirable.

The order of combining the reactants and catalyst will depend upon the particular starting materials employed. An olefin which is readily polymerizable in the presence of the catalyst should not be mixed with the catalyst in the absence of the thiasulfone. Similar precautions should be taken to prevent the decomposition of thiasulfone which may occur in the sole presence of strong acidic condensation catalysts.

The reaction of an olefinic compound with a thiasulfone proceeds with considerable evolution of heat. In addition to conventional cooling methods, a volatile solvent can be employed for the reactants. The volatilization and refluxing the solvents will effect a cooling of the reaction mass. Suitable solvents include paraffinic hydrocarbons which are resistant to the action of the acidic condensation catalysts under the reaction conditions, for example naphthas, petroleum ether, liquefied propane, butane and the like.

The particular technique for separating the desired product from the reaction mixture will depend upon the particular reactants, catalysts, solvents, etc. The sulfonylated thioethers retained in any solvent which might be used in the reactor or otherwise not absorbed in the catalyst layer, can usually be separated from accompanying materials by fractional distillation, azeotropic distillation, fractional crystallization or similar well-known separation techniques.

With reference to the drawing, the single figure illustrates a flow diagram embodying the process of the invention. In the flow diagram shown, the reactor 10 is provided with a cooling jacket (or cooling coils) 11 through which a cooling fluid may be circulated to aid in maintaining a desired temperature in the reactor. A catalyst, for example commercial liquid hydrogen flouride, is charged into the reactor through line 12. An organic thiasulfone, for example diethyl thiasulfone, is charged into the reactor through line 13. If desired, a solvent, for example n-heptane, can be charged into the reactor through line 14. An olefin, for example ethylene, is charged into the reactor through line 15. If desired, the olefin and thiasulfone respectively, may be dissolved or dispersed in a solvent before passing into the reactor. In the reactor, the reactants, catalyst and solvent are brought into intimate contact by agitator 16 or other suitable mixing device. In a desirable mode of operation the thiasulfone, catalyst and solvent are charged to the reactor and the olefin is added in increments over the course of the reaction period. The reaction generates heat, part of which is removed by the fluid circulating through cooling jacket 11 and part by vapors of the solvent and reactants which pass into line 17 containing a back pressure valve 18 and condenser 19 which liquefies the vapors so that they may reflux back into the reactor. Suitable reaction temperatures, for example, lie between about 25° C. and about 120° C. and suitable pressures are about 10 to about 500 p. s. i. g. After the reaction has proceeded to the desired extent, for example after a residence time of the reactants and catalyst in the reactor of about 2 hours, the reaction mixture is withdrawn from the reactor through valved line 20 and passed through cooler 21 wherein its temperature is reduced to a desired value, for example about 25° C., whence it is passed into separator 22.

A sufficient amount of the catalyst may be employed to function also as a solvent for the reaction product. Thus, for example about one volume of commercial liquid hydrogen fluoride can be employed per volume of organic thiasulfone feed stock. In the separator two liquid phases are formed. The lower phase is a solution of the sulfonylated thioether reaction product in liquid hydrogen fluoride. The catalyst phase also exhibits some solvent capacity for the organic thiasulfone reactant. The upper phase comprises the hydrocarbon solvent and some of the organic thiasulfone reactant. Olefins which are normally gaseous and which have escaped reaction and other gases may be vented through valved line 23. The phase comprising predominantly hydrocarbon solvent is withdrawn from the separator through line 24 and may be recycled to the reactor through valved lines 25 and 14. All or a portion of the solvent phase may be withdrawn through valved line 26 for purification or separation of the phase into its constituents such as unreacted thiasulfone and solvent, each of which can, if desired, be returned to the reactor. When an insufficient amount of catalyst is employed to function also as a solvent for the reaction product, a substantial portion of the reaction product is present in the hydrocarbon solvent phase and can be recovered therefrom by more or less conventional methods such as fractional distillation, following which the solvent and unreacted materials are returned to the reactor. The lower phase in the separator, in which the catalyst predominates, is withdrawn through valved line 27 and, if it is desired to recycle catalyst and the compounds absorbed therein to the reactor, is passed through valved lines 28, 29 and 12 into reactor 10. Ordinarily it will be desirable to separate catalyst from materials dissolved therein before recycle.

When the catalyst is used in sufficient quantity to function also as a solvent, part or all of the lower phase from separator 22 is passed through lines 27 and 30 into a recovery zone 31 which is schematically illustrated. By way of example, if hydrogen fluoride is employed as the catalyst, recovery zone 31 may take the form of a distillation zone, catalyst being vaporized and removed from said zone through valved line 32. To aid in removing the catalyst from material absorbed or dissolved therein, the recovery zone may be operated under reduced pressure or minimum-boiling azeotrope forming agents such as propane, butanes or pentanes may be passed into the zone to distill with the hydrogen fluoride. The residue from the recovery zone will ordinarily consist of a mixture of unreacted thiasulfone and product which are removed by valved line 33. The catalyst withdrawn from the recovery zone through line 32 may be recycled to the reactor through valved lines 34, 29 and 12. All or part of the catalyst may be passed through valved line 35 to a purification zone, for example a distillation zone in the case of HF, or to a zone where fresh catalyst is added to fortify the used catalyst, before recycling catalyst to the reactor.

The sulfur compounds withdrawn from the recovery zone through line 33 are passed through a neutralizer 36 wherein they are contacted with alkaline materials such as aqueous caustic to remove small amounts of acid catalyst contained therein. From the neutralized the sulfur compounds are passed through line 37 into a fractionator 38. Fractionator 38 is operated at reduced pressure and is provided with a valved gas vent 39. Unreacted thiasulfone may be removed from the fractionator through valved line 40 for recycle to reactor 10 and the reaction product may be removed through valved line 41 to storage or treatment.

The following examples are intended solely to illustrate our invention.

*Example 1*

Methyl thiasulfone was prepared by adding dropwise under an atmosphere of nitrogen 337 ml. of 1:1 nitric acid and subsequently 150 ml. concentrated nitric acid to 230 grams of methyl disulfide while maintaining the temperature below 33° C. The resulting crude dimethyl thiasulfone was airblown and washed several times with water to remove nitric acid. The resulting product was distilled. The purified thiasulfone contained 50.7 percent sulfur and had a refractive index $(n_D^{20})$ of 1.5123. The calculated sulfur content of dimethyl thiasulfone is 50.7 percent. A mixed alkanesulfonic acid consisting of methyl, ethyl, and propyl sulfonic acids was employed as a catalyst. A high-pressure reactor equipped with automatic stirring apparatus was charged with 20 grams of the dimethyl thiasulfone and 20 grams of the said mixed alkanesulfonic acids. The mixture was heated at a temperature between 100° and 120° C. and was vigorously agitated in the reactor under about 800 p. s. i. g. partial pressure of ethylene for a period of about two hours. The reaction products were allowed to cool and were discharged from the reactor into 50 ml. of distilled water. A precipitate was obtained and this precipitate was crystallized from hot water and identified by means of sulfur analysis and melting point as

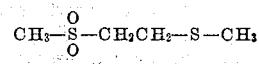

(Journal of the Chemical Society, London, 1927, part 2, page 1803). The reported melting point for this sulfone thioether is 128°–130° C. The melting point of the present reaction product was 130° C. The theoretical sulfur content of the foregoing reported compound is 41.6 percent sulfur; the determined sulfur content of the present product was the same. A liquid and a solid by-product in quite minor amounts were also separated from the reaction product.

*Example 2*

A reaction mixture constituting of 50 grams of methyl thiasulfone prepared as described in Example 1, 42 grams of heptene-1, and 72 grams of phosphoric acid as the acidic condensation catalyst, was heated at 71° to 78° C. in a flask under atmospheric pressure and was vigorously agitated for a period of four hours. Upon cooling, the reaction mixture separated into two layers. The lower layer, containing the phosphoric acid and the reaction product, was extracted several times with diethyl ether. The ether was removed from the extract by distillation. The ether-extracted product was fractionally distilled. Two major products, one boiling at 142° C. and the other at 65° C., and a very minor fraction boiling at about 115° C., all at 1 mm. Hg were obtained. The molecular weight and sulfur content of the highest boiling fraction was determined. A determined molecular weight of 222 and a sulfur content of 27.9 percent compares with a calculated molecular weight of 224 and a calculated sulfur content of 28.6 percent for the sulfone thioether having a structure

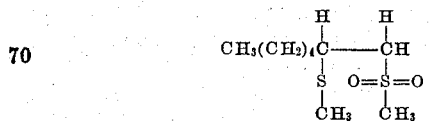

The product is a liquid having a pleasant odor. The above identified sulfone thioether had a refractive index $(n_D^{20})$ of 1.4962. The fraction boiling between 63° and 64° C. at 1 mm. Hg had a refractive index ($n_D^{20}$) of 1.477.

Example 3

Dimethyl thiasulfone was prepared by partial oxidation of dimethyl disulfide with dilute nitric acid. A charge of 126 grams of the dimethyl thiasulfone was introduced into a reaction vessel that was fitted with a stirrer, a thermometer, and a reflux condenser. Catalyst in the amount of 183.5 grams of mixed alkanesulfonic acids consisting of methyl, ethyl and propylsulfonic acids and 104.5 grams of heptene-1 were then added. The resulting mixture was stirred for eight hours while cooling the reaction vessel to keep the temperature below 26° C. The product was then heated to a temperature between 71° and 79° C. for four and one half hours. The reactor contents were discharged into a large volume of cracked ice and water, and 158 grams of water insoluble material were separated. An additional 33 grams of water insoluble organic material was recovered by ether extraction, followed by steam distillation to separate the ether. The ether extract was vacuum distilled, and one fraction consisted of an orange yellow liquid having a boiling point of 95° C. at about 0.05 mm. Hg and a refractive index ($n_D^{20.5}$) of 1.4921 and containing 24.3 percent sulfur, apparently corresponding to the sulfone thioether reaction product of dimethyl thiasulfone and heptene-1 obtained in Example 2.

Example 4

In this example butene-2 was passed into 3.0 mols of ethane sulfonic acid with stirring and cooling until 78 percent of the acid was converted into secondary butyl ethane sulfonate. To 230 grams of this product were added 157.5 grams of dimethyl thiasulfone, and the resulting solution was heated with stirring for two hours at 55° to 90° C., and then for 7.33 hours at 90° to 100° C. The resulting product was water washed and was then steam distilled, whereby 34 cc. of a water insoluble organic distillate containing about 61 percent sulfur was obtained. A portion of the non-steam-distillable organic material was then vacuum distilled. Substantially all of the distillate obtained by vacuum distillation was a yellow liquid boiling at about 80° C. at about 1 mm. Hg and with a refractive index ($n_D^{20}$) of 1.54. This product was further demonstrated to be the sulfone thioether having the following structure:

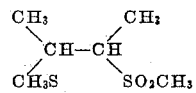

The above sulfone thioether was found to contain 35.6 percent sulfur as compared to a calculated value of 35.2 percent.

Example 5

The reactor was charged with 19 grams of heptene-1, 25 grams of methyl phenyl thiasulfone, and 25 grams of the mixed alkanesulfonic acids defined in Example 1. The reactants and catalyst were stirred for a period of about 8 hours at atmospheric pressure and at a temperature between 85° and 100° C. A pale yellow liquid product was obtained in an amount of 15.8 grams and yield of 43 percent. The determined sulfur was 20 percent; calculated sulfur for the asymmetric isomers in the sulfone thioether reaction product is 22.1 percent.

Example 6

The reactor was charged with 110 grams of di-isobutylene and 76 grams of dimethyl thiasulfone. The reactants were heated in the presence of 50 grams of mixed alkanesulfonic acids to a temperature of 100° to 120° C. at atmospheric pressure and for a period of seven hours. 50 grams of product were obtained, this representing a 35 percent theoretical yield of crude product having a sulfur content of 15 weight per cent. The product was a pale yellow liquid and exhibited a rather wide distillation range at 1 mm. Hg of 50° to 120° C.

Example 7

The reactor was charged with 104 grams of heptene-1 and 76 grams of dimethyl thiasulfone. The reactants were heated in the presence of 50 grams of an 80 percent concentrated sulfuric acid to a temperature between 100° and 120° C. under a mild gauge pressure for a period of seven hours. A yield of 92 grams, representing a 68 percent yield, of a pale yellow liquid was obtained. This product was fractionated under 1 mm. Hg pressure. A fraction was obtained that had a boiling range between 140° and 165° C. at 1 mm. Hg, a refractive index of 1.4891, and a sulfur content of 21 percent. This fraction constituted a 25 percent yield of incompletely refined sulfone thioether reaction product of heptene-1 and dimethyl thiasulfone having the formula

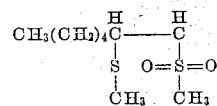

Example 8

The reactor was charged with 10 grams of 1,3-butadiene and 30 grams of dimethyl thiasulfone. The reactants were heated in the presence of 20 grams of ethanesulfonic acid to a temperature between 100° and 125° C. and under a pressure of 50 p. s. i. g. for a period of seven hours. The reaction mass was agitated during the said seven hour reaction period. A yield of 14 grams, or 38 percent of theoretical, of a dark colored solid product soluble in methanol and insoluble in water, having a softening point of about 120° C. and a sulfur content of 19.8 percent, was obtained.

Example 9

The reactor was charged with 140 grams of heptene-1 and 88 grams of dimethyl thiasulfone. These reactants were heated in the presence of 150 grams of hydrofluoric acid at a temperature between 75° and 95° C. and under atmospheric pressure for a period of one and one half hours. A yield of 39 grams, or 25 percent of theoretical, of a pale yellow liquid was obtained. The crude liquid product had a boiling range of 65° to 115° C. at 1 mm. Hg and a sulfur content of 22 weight percent compared to a theoretical sulfur content of 28.5 percent.

Example 10

The reactor was charged with 30 grams of dimethyl thiasulfone, 8 grams of 1,3-butadiene, and 10 grams of phosphoric acid. The reaction mixture was heated to a temperature between 100° and 120° C. under a pressure of 50 p. s. i. g. for a period of an hour and a half. A solid product weighting 25 grams was recovered from the reaction mixture. This yield of crude product represents 65 percent of theoretical. The solid is a reaction product of the thiasulfone and the butadiene. A polymerization product of butadiene under the given conditions would be liquid.

The 1,4-sulfone thioethers of the present invention are useful as oxidation inhibitors as stated herein above and also as corrosion inhibitors, insecticides, and dyestuff intermediates.

Having described our invention, we claim:

1. A process for the preparation of a sulfone thioether which comprises reacting a hydrocarbon thiasulfone with a compound affording at least one olefinic linkage in the presence of a chemical compound which is an acidic condensation catalyst.

2. The process of claim 1 wherein the acidic condensation catalyst is sulfuric acid.

3. The process of claim 1 wherein the catalyst is concentrated hydrogen fluoride.

4. The process of claim 1 wherein the catalyst is phosphoric acid.

5. The process of claim 1 wherein the catalyst is boron fluoride.

6. The process which comprises reacting a hydrocarbon thiasulfone with an organic compound having an independently functionable carbon-to-carbon double bond in the presence of a chemical compound which is an acidic condensation catalyst.

7. A process for the preparation of a sulfone-thioether which comprises reacting a hydrocarbon thiosulfone with a mono-olefinic hydrocarbon in the presence of a liquid acidic condensation catalyst and at a temperature between −20° C. and 170° C., and thereafter separating sulfone-thioether reaction product from the liquid acidic condensation catalyst.

8. The process of claim 7 wherein the hydrocarbon thiasulfone is an alkyl thiasulfone.

9. The process of claim 7 wherein the hydrocarbon thiasulfone is an aryl thiasulfone.

10. The process of claim 7 wherein the hydrocarbon thiasulfone is an asymmetrical thiasulfone.

11. The process of claim 7 wherein the catalyst is sulfuric acid.

12. The process of claim 7 wherein the catalyst is hydrogen fluoride.

13. The process of claim 7 wherein the catalyst is phosphoric acid.

14. The process of claim 7 wherein the catalyst is an alkanesulfonic acid.

15. The process of claim 14 wherein the catalyst is a mixed alkanesulfonic acid having from one to four carbon atoms per molecule.

16. The process which comprises reacting a hydrocarbon thiasulfone with an olefinic hydrocarbon in the presence of a liquid acidic condensation catalyst between about −20° C. and 170° C. and a pressure between zero and 1000 pounds per square inch gauge and separating a reaction product of the said thiasulfone and said olefin.

17. The process of claim 16 in which the said olefin is a diolefin.

18. The process of claim 17 in which the diolefin is butadiene.

19. A process for the preparation of a sulfone thioether which comprises reacting a hydrocarbon thiasulfone with a mono-olefinic hydrocarbon, having the formula

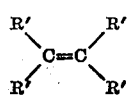

in which each R' is selected from the group consisting of hydrogen and organic radicals, in the presence of a liquid acidic condensation catalyst at a temperature between about −20° C. and 170° C. and a pressure between zero and 1000 pounds per square inch gauge and separating from the reaction mass, including the said liquid catalyst, a 1,4-sulfone thioether having the formula:

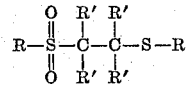

in which each R and each R' are selected from the group consisting of hydrogen and organic radicals.

20. The process of claim 19 in which the thiasulfone is a dialkyl thiasulfone.

21. The process of claim 20 in which the dialkylthiasulfone is dimethyl thiasulfone.

22. The process of claim 19 in which the thiasulfone is diethyl thiasulfone.

23. The process of claim 19 in which the thiasulfone is methyl phenyl thiasulfone.

24. A process for the preparation of a sulfone-thioether which comprises reacting a hydrocarbon thiasulfone with a mono-olefinic hydrocarbon in the presence of boron trifluoride at a temperature between −20° C. and 170° C., and thereafter separating sulfone-thioether as a reaction product from the boron trifluoride.

25. The process of claim 7 wherein the temperature is between about 25° C. and about 120° C.

26. The process of claim 16 wherein the temperature is between about 25° C. and about 120° C.

27. A process for the production of sulfur-containing products comprising a sulfone-thioether, which process comprises effecting reaction between a hydrocarbon thiasulfone and a compound affording an olefinic hydrocarbon in the presence of an acidic condensation catalyst.

28. A process for the production of sulfur-containing products comprising a sulfone-thioether, which process comprises effecting reaction between a hydrocarbon thiasulfone and an olefinic hydrocarbon in the presence of an acidic condensation catalyst.

References Cited in the file of this patent

UNITED STATES PATENTS

| | | |
|---|---|---|
| 2,451,874 | Routson | Oct. 19, 1948 |
| 2,519,586 | McCaulay et al. | Aug. 22, 1950 |
| 2,573,580 | Ladd | Oct. 30, 1951 |

OTHER REFERENCES

Hinsberg: Ber. Deut. Chem. Ges., vol. 41, page 2836 (1908).